Figure 1:
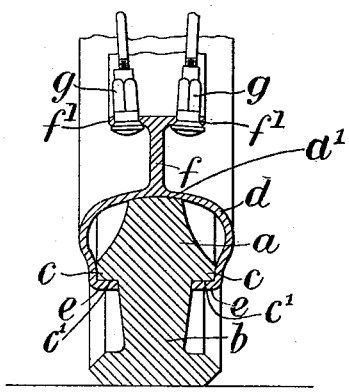

No. 637,174. Patented Nov. 14, 1899.
P. A. SPARRE.
ELASTIC TIRE AND RIM FOR WHEELS.
(Application filed Jan. 10, 1899.)

(No Model.)

Witnesses.

Inventor.

UNITED STATES PATENT OFFICE.

PIERRE AMBJÖRN SPARRE, OF LONDON, ENGLAND.

ELASTIC TIRE AND RIM FOR WHEELS.

SPECIFICATION forming part of Letters Patent No. 637,174, dated November 14, 1899.

Application filed January 10, 1899. Serial No. 701,750. (No model.)

*To all whom it may concern:*

Be it known that I, PIERRE AMBJÖRN COMTE DE SPARRE, a subject of the King of Sweden and Norway, residing at London, England, have invented new and useful Improvements in and Relating to Elastic Tires and Rims for Wheels, (for which I have applied for patents in Great Britain, No. 13,465, dated June 16, 1898; in Germany, No. 11,549, dated June 25, 1898, and No. 11,830, dated October 11, 1898; in Austria, November 22, 1898; in Denmark, No. 1,237, dated November 23, 1898; in Belgium, No. 109,017, dated November 23, 1898; in Spain, November 24, 1898; in Italy, No. 854, dated November 24, 1898; in Switzerland, No. 19,804, dated November 24, 1898; in Hungary, No. 16,808, dated November 26, 1898, and in Sweden, No. 18,521, dated November 28, 1898,) of which the following is a specification.

This invention relates to elastic tires and rims for the wheels of bicycles, tricycles, and other velocipedes or vehicles—such as carriages, motor-cars, &c.—the object of the invention being to provide improved means for rendering tires elastic and yielding without the use of an inflated air-chamber.

According to my invention I form or mold tires of a vertically-oblong shape adapted to stand freely upon the inside of the bottom of a wheel-rim and supported on each side by the edges of the said rim, which are turned horizontally inward and engage horizontal annular shoulders formed around the tire. With this arrangement the tire is prevented from slipping out of the rim, and the lateral ribs thereof can move freely up and down within the rim, according to the pressure exerted on the tire by the rider. The sectional form of the tire above and below the lateral ribs can be of any suitable shape, provided that the inner part is so much narrower than the inside breadth of the rim as to allow it to expand laterally within the rim when the wheel passes over an obstacle. However, I prefer to give these outer and inner parts a tapering form, and sometimes I enlarge the tread in order that the wheel shall run more easily on sandy and muddy roads. The outer part, which consists, essentially, of an annular web extending from the aforesaid shoulders toward the tread, is formed in such a manner that it expands under the pressure on the tread in the same proportion as it sinks into the inner part of the rim in order that the distance between the horizontal edges of the rim shall always remain closed up, thus preventing dust and water from entering the hollow part of the rim. As the tire once clutched by the horizontal edges of the rim cannot be taken out for the repair of broken spokes, I provide lateral extensions at the bottom of the rim, and I bore the holes for the spoke-nipples in the horizontal flanges formed by these extensions. It is evident that this latter construction is not necessary with carriage-wheels having the spokes fixed to an inner wood rim.

To enable the invention to be fully understood, I will describe it by reference to the accompanying drawings, in which—

Figure 2:
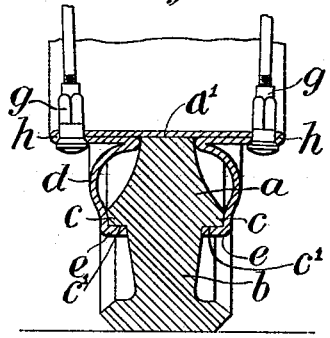
Figure 3:
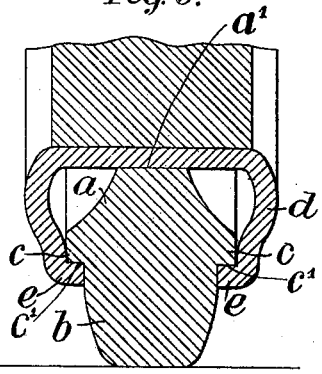

Figures 1 and 2 are sections through bicycle tires and rims made according to the invention. Fig. 3 is a similar view through a vehicle-wheel having an inner wood rim.

In the drawings, $b$ represents the rim, provided with inwardly-extending retaining-flanges $e$ $e$.

My improved tire is provided between the tread and the interior surface with lateral ribs $c$ $c$, the outer faces of which form laterally-extending annular shoulders $c'$ $c'$, perpendicular to the vertical plane of the wheel, and these shoulders engage the inner faces of the flanges $e$ $e$. The portion $a$ of the tire between said shoulders and the interior face $a'$ of the tire decreases in width or thickness and is of less width than the rim to allow room for it to expand laterally within the rim.

$b$ represents an annular web with which the tire is provided and which extends from the shoulders $c'$ $c'$ to the tread portion of the tire. This web is adapted to be pushed into the rim between the edges of the flanges $e$ $e$. Hence at no point must it exceed in width its width adjacent to the shoulders $c'$ $c'$. I prefer to have said web decrease gradually in width from the shoulders toward the rim to allow for the lateral expansion of the web which will be produced when it is pressed toward the center of the wheel and which might otherwise expand the web laterally to such an extent that it would not pass between the edges of the rim-flanges. This expansion insures the web at all times filling the space between the flanges even while moving in and out between them, thus excluding water and dust from the interior of the rim.

In Figs. 1 and 2, which, as above mentioned, are cycle-wheels, provision is made for repairing a broken spoke without removing the tire from the rim, which, as above stated, are permanently secured together. In the arrangement shown in Fig. 1 the bottom or back of the rim $d$ is provided with a vertical web or flange $f$, the said web or flange being formed at its free end with lateral extensions $f'\,f'$, provided with holes to receive the nipples $g\,g$ for the spokes. In Fig. 2 the rim is shown formed with lateral extensions $h\,h$, extending directly from the bottom of the rim $d$—that is to say, without the employment of the web or flange. With both these constructions it is obvious that if a spoke break it can be renewed by removing its nipple from the extension and screwing in a fresh spoke. In these figures the tread of the tire is shown enlarged for the purpose, as above mentioned, of enabling the wheel to run more easily on sandy and muddy roads.

Fig. 3 illustrates a vehicle-wheel provided with an inner wood rim, the metal rim $d$ being secured to it by ordinary means. With this arrangement it is obviously unnecessary to provide lateral extensions to the rim of the kind above described.

It will be obvious that the arrangement above described for enabling spokes to be renewed without removing the tire from the rim can be applied to wheel-rims fitted with pneumatic tires.

Having now particularly described and ascertained the nature of my said invention and in what manner the same is to be performed, I declare that what I claim is—

In a vehicle-wheel, the combination with the rim provided with inwardly-extending flanges, of an integral elastic tire having laterally-extending flanges engaging said rim within the inwardly-extending flanges thereof, said tire having an annular portion within the circle of said lateral flanges, decreasing in diameter to the inner face of the rim and an annular web extending outwardly from said lateral flanges, between the flanges of the rim, and decreasing in thickness toward the tread portion of the tire, whereby said web can move inwardly between the flanges of the rim when subjected to pressure in a direction radially of the wheel, said pressure causing said web to expand laterally so as to always fill the space between said rim-flanges and prevent dust or moisture from entering therein, substantially as described.

PIERRE AMBJÔRN SPARRE.

Witnesses:
G. F. REDFERN,
JOHN E. BOUSFIELD.